United States Patent
Banda et al.

(10) Patent No.: US 11,296,612 B2
(45) Date of Patent: Apr. 5, 2022

(54) CARRIER-BASED PULSE WIDTH MODULATION CONTROL FOR BACK-TO-BACK VOLTAGE SOURCE CONVERTERS

(71) Applicant: General Electric Company, Schenectady, NY (US)

(72) Inventors: Joseph Kiran Banda, Bangalore (IN); Kapil Jha, Bangalore (IN); Hridya Ittamveettil, Bangalore (IN); Arvind Kumar Tiwari, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 16/730,301

(22) Filed: Dec. 30, 2019

(65) Prior Publication Data

US 2021/0203242 A1 Jul. 1, 2021

(51) Int. Cl.
  *H02M 5/453* (2006.01)
  *H02M 5/458* (2006.01)
  *H02P 27/08* (2006.01)

(52) U.S. Cl.
  CPC .......... *H02M 5/458* (2013.01); *H02P 27/085* (2013.01)

(58) Field of Classification Search
  CPC .... H02M 5/453; H02M 5/4585; H02M 5/458; H02P 27/085; H02P 27/06; H02P 27/08
  See application file for complete search history.

(56) References Cited

U.S. PATENT DOCUMENTS

| 10,224,830 B2 | 3/2019 | Basic et al. |
| 10,742,149 B1* | 8/2020 | Gadiraju ................. F03D 9/255 |
| 2012/0056602 A1* | 3/2012 | Li ............................ H02P 9/48 322/89 |

(Continued)

FOREIGN PATENT DOCUMENTS

| CN | 109756126 A | 5/2019 |
| JP | 6183154 B2 | 8/2017 |

OTHER PUBLICATIONS

European Search Report for EP Application No. 20213841.8 dated May 6, 2021.

(Continued)

*Primary Examiner* — Adolf D Berhane
(74) *Attorney, Agent, or Firm* — Dority & Manning, P.A.

(57) ABSTRACT

A method for controlling a voltage source power converter of a renewable energy power conversion system includes providing the voltage source power converter having, at least, a rotor-side converter and a line-side converter. The method also includes generating, via a converter controller, a first set of switching pulses based on a third-harmonic phase opposition carrier-based pulse width modulation (PO_CB_PWM) scheme. Further, the method includes generating, via the converter controller, a second set of switching pulses based on a third-harmonic in phase carrier-based pulse width modulation (IP_CB_PWM) scheme. As such, the method includes implementing, via the converter controller, a pulse-width modulation scheme for the rotor-side and line-side converters using the first and second sets of switching pulses, respectively, to obtain an output voltage from the voltage source converter to a desired magnitude, shape, and/or frequency.

20 Claims, 6 Drawing Sheets

(56) References Cited

U.S. PATENT DOCUMENTS

| | | | | |
|---|---|---|---|---|
| 2015/0180273 | A1* | 6/2015 | Wagoner | H02M 5/293 290/50 |
| 2019/0312502 | A1 | 10/2019 | Ganireddy et al. | |
| 2020/0358289 | A1* | 11/2020 | Kolhatkar | F03D 7/028 |
| 2021/0320601 | A1* | 10/2021 | Wagoner | H02M 5/4585 |
| 2021/0328531 | A1* | 10/2021 | Jha | F03D 9/25 |

OTHER PUBLICATIONS

Renge, Mohan M. et al., Multilevel Inverter to Reduce Common Mode Voltage in AC Motor Drives Using SPWM Technique, Journal of Power Electronics, vol. 11, No. 1, Jan. 20, 2011, p. 21-27.

Joseph, Anto et al., Fault Diagnosis and Fault-Tolerant Control of Megawatt Power Electronic Converter-Fed Large-Rated Asynchronous Hydrogenerator, IEEE Journal of Emerging and Selected Topics in Power Electronics, IEEE, Piscataway, NJ, USA, vol. 7, No. 4, Dec. 1, 2019, p. 2403-2416.

Pham, Khoa Dang et al., A Reduced Common-Mode-Voltage Pulsewidth Modulation Method With Output Harmonic Distortion Minimization for Three-Level Neutral-Point-Clamped Inverters, IEEE Transactions on Power Electronics, IEEE, USA, vol. 35, No. 7, Dec. 16, 2019, p. 6944-6962.

Senturk, Osman S., et al., A Single Leg Switched PWM Method for Three-phase H-Bridge Voltage Source Converters, Energy Conversion Congress and Exposition, 2009, ECCE, IEEE, Piscataway, NJ, USA, Sep. 20, 2009, p. 3137-3142.

Sujod et al., Harmonics and Common Mode Voltage in a DFIG with Two-Level and Three-Level NPC Converter using Standard PWM Techniques, IECON 2013—39$^{th}$ Annual Conference of the IEEE Industrial Electronics Society, Vienna Austria, 2013. (Abstract Only).

* cited by examiner

CARRIER-BASED PULSE WIDTH MODULATION CONTROL FOR BACK-TO-BACK VOLTAGE SOURCE CONVERTERS

FIELD

The present disclosure relates generally to voltage source converters, and more particularly to systems and methods for controlling three-level back-to-back voltage source converters for renewable energy power systems based on carrier-based pulse width modulation schemes.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor.

In many conventional wind turbine configurations, the generator is electrically coupled to a bi-directional voltage source power converter that includes a rotor-side converter (RSC) joined to a line-side converter (LSC) via a regulated DC link. Each of the RSC and the LSC typically includes a bank of pulse width modulated switching devices, for example, insulated gate bipolar transistors (IGBTs). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). In general, the LSC is used to control the power factor at the input mains along with DC bus voltage regulation, whereas the RSC is used to control active/reactive power for variable speed operation of the wind turbine.

PWM voltage source converters switch at higher frequencies to obtain better voltage output for driving the wind turbine and to integrate the wind turbine to the power grid. While doing so, such converters also generate high frequency common mode voltages with higher dv/dt. This common mode voltage drives high frequency leakage currents through parasitics of the generator, typically through bearings, thereby causing premature bearing failures. This invention will solve the origin of the problem reducing common mode voltage at the rotor side.

Thus, an improved system and method for controlling voltage source converters of renewable energy power systems, such as wind turbines, based on carrier-based pulse width modulation schemes that address the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for controlling a voltage source power converter of a renewable energy power conversion system. The method includes providing the voltage source power converter having, at least, a rotor-side converter and a line-side converter. The method also includes generating, via a converter controller, a first set of switching pulses based on a third-harmonic phase opposition carrier-based pulse width modulation (PO_CB_PWM) scheme. Further, the method includes generating, via the converter controller, a second set of switching pulses based on a third-harmonic in phase carrier-based pulse width modulation (IP_CB_PWM) scheme. As such, the method includes implementing, via the converter controller, a pulse-width modulation scheme for the rotor-side and line-side converters using the first and second sets of switching pulses, respectively, to obtain an output voltage from the voltage source converter to a desired magnitude, shape, and/or frequency.

In an embodiment, the voltage source power converter may be a three-level voltage-source power converter. In another embodiment, implementing the pulse-width modulation scheme for the rotor-side and line-side converters using the first and second sets of switching pulses, respectively, may include controlling gate timing commands of a first plurality of pulse-width modulation (PWM) switching devices of the rotor-side converter based on the first set of switching pulses and controlling gate timing commands of a second plurality of PWM switching devices of the line-side converter based on the second set of switching pulses.

In further embodiments, the first and second plurality of PWM switching devices may include insulated-gate bipolar transistors (IGBTs).

In additional embodiments, the first set of switching pulses is configured to reduce a common mode voltage at the rotor-side converter as compared to the second set of switching pulses. Moreover, the second set of switching pulses is configured to provide a lower output voltage total harmonic distortion at the line-side converter as compared to the first set of switching pulses.

In several embodiments, the renewable energy power conversion system may include a doubly-fed induction generator coupled to the voltage source power converter. In still further embodiments, the renewable energy power conversion system may include a wind turbine power system, a solar power system, and/or an energy storage system.

In another aspect, the present disclosure is directed to a power conversion system for a renewable energy power system. The power conversion system includes a voltage source power converter having a rotor-side converter and a line-side converter. The rotor-side converter includes a first plurality of PWM switching devices and the line-side converter includes a second plurality of PWM switching devices. The power conversion system also includes a converter controller for generating a first set of switching pulses based on a third-harmonic phase opposition carrier-based pulse width modulation (PO_CB_PWM) scheme and a second set of switching pulses based on a third-harmonic in phase (IP) carrier-based (CB) pulse width modulation (IP_CB_PWM) scheme. As such, the converter controller is further configured for controlling gate timing commands of the first and second plurality of PWM switching devices of the rotor-side converter and the line-side converter based on the first and second sets of switching pulses, respectively. It should be further understood that the power conversion system may further include any of the additional features described herein.

In yet another aspect, the present disclosure is directed to a wind turbine power system. The wind turbine power system includes a generator having a rotor and stator and a power conversion system electrically coupled to the generator. The power conversion system includes a voltage source power converter having a rotor-side converter and a line-side converter. The rotor-side converter includes a first plurality of PWM switching devices and the line-side converter includes a second plurality of PWM switching devices. The power conversion system further includes a converter controller for generating a first set of switching pulses based on a third-harmonic carrier-based pulse width modulation (PO_CB_PWM) scheme and a second set of switching pulses based on a third-harmonic in phase carrier-based pulse width modulation (IP_CB_PWM) scheme. Moreover, the converter controller is configured for controlling gate timing commands of the first and second plurality of PWM switching devices of the rotor-side converter and the line-side converter based on the first and second sets of switching pulses, respectively. It should be further understood that the wind turbine power system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
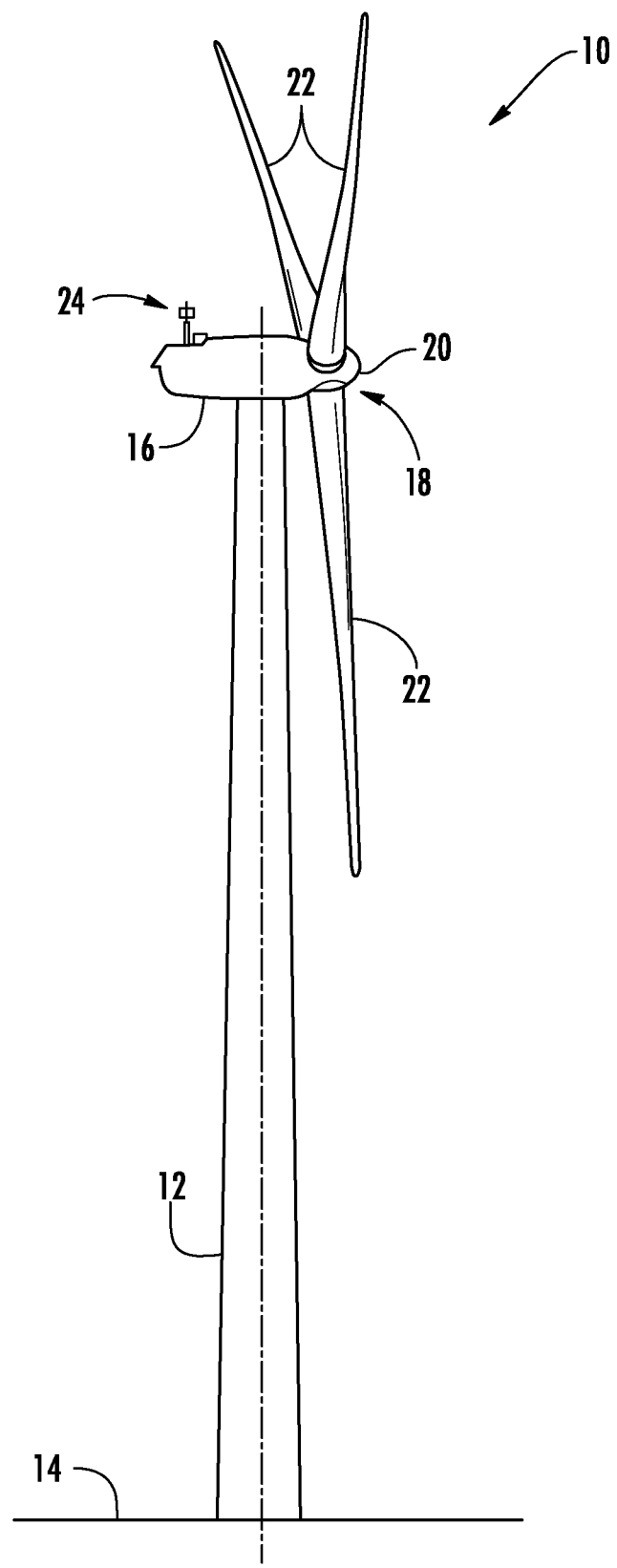
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy. One or more wind conditions, such as wind speed and/or wind direction may also be monitored via a wind sensor 24, such as an anemometer, located on the nacelle 16 or any other suitable location near the wind turbine 10.

Figure 2:
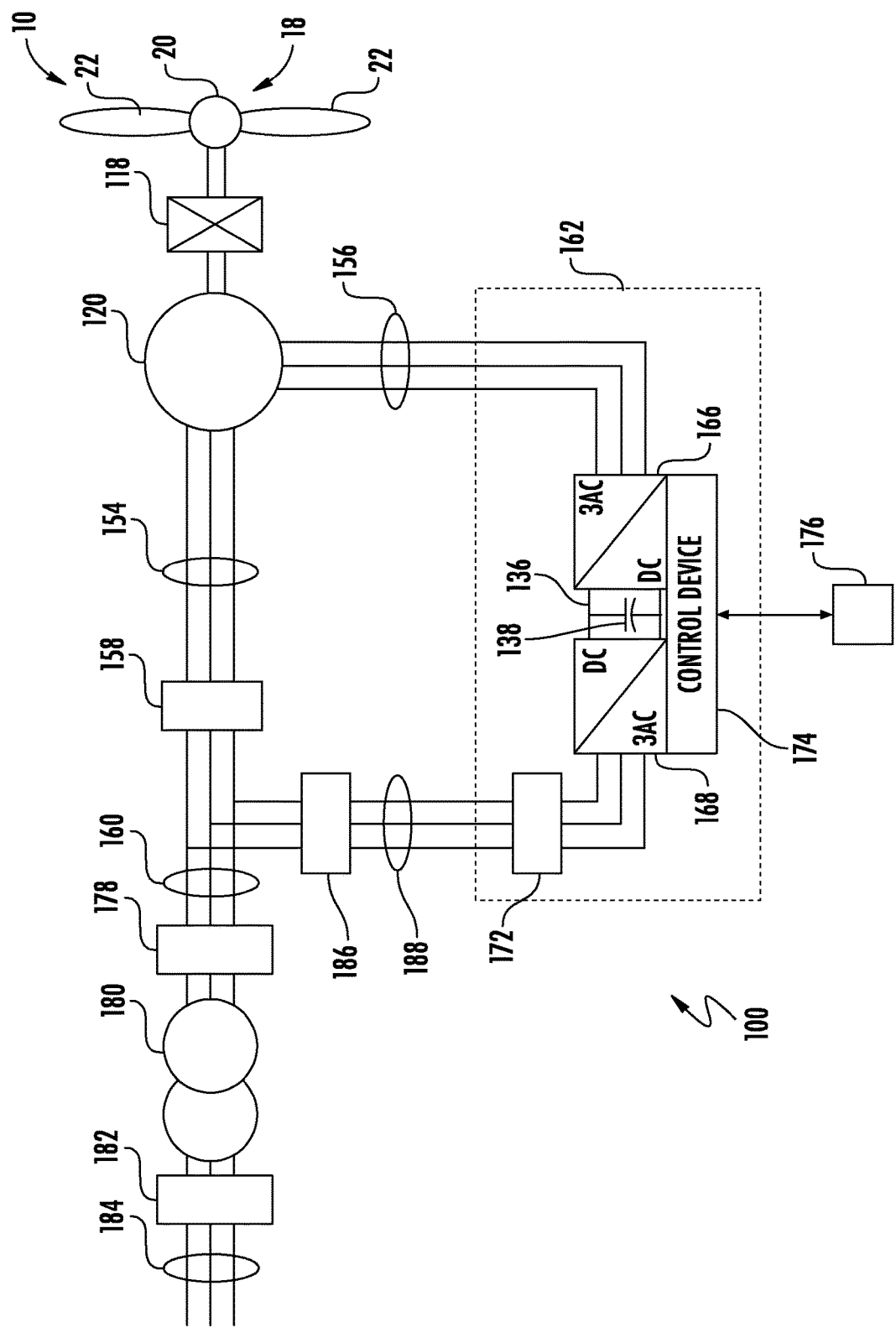
FIG. 2 illustrates a schematic view of one embodiment of a wind turbine electrical power system suitable for use with the wind turbine shown in FIG. 1.

Referring now to FIG. 2, a schematic diagram of one embodiment of a wind turbine power system 100 ("wind turbine system") is illustrated in accordance with aspects of the present disclosure. Although the present disclosure will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gearbox 118, which is, in turn, coupled to a generator 120, which may be a doubly fed induction generator (DFIG). As shown, the DFIG 120 may be connected to a stator bus 154. Further, as shown, a power converter 162 may be connected to the DFIG 120 via a rotor bus 156, and to the stator bus 154 via a line side bus 188. As such, the stator bus 154 may provide an output multiphase power (e.g. three-phase power) from a stator of the DFIG 120, and the rotor bus 156 may provide an output multiphase power (e.g. three-phase power) from a rotor of the DFIG 120. The power converter 162 may also include a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 may be coupled to a converter controller 174 in order to control the operation of the rotor side converter 166 and/or the line side converter 168 as described herein. It should be noted that the converter controller 174 may be configured as an interface between the power converter 162 and a local wind turbine control system 176 and may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162. For an individual DFIG wind turbine power system 100, the reactive power may be supplied primarily by the RSC 166, via the generator 120 and the LSC 168.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at the hub 20 and the blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor. More specifically, electrical power may be transmitted from the stator bus 154 to the line side bus 188 and subsequently through the line contactor 172 and into the power converter 162, specifically the LSC 168 which acts as a rectifier and rectifies the sinusoidal, three-phase AC power to DC power. The DC power is transmitted into the DC link 136. The capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power by adjusting voltages, currents, and frequencies. This conversion is monitored and controlled via the converter controller 174. The converted AC power is transmitted from the RSC 166 via the rotor bus 156 to the generator rotor. In this manner, generator reactive power control is facilitated by controlling rotor current and voltage.

Figure 3:
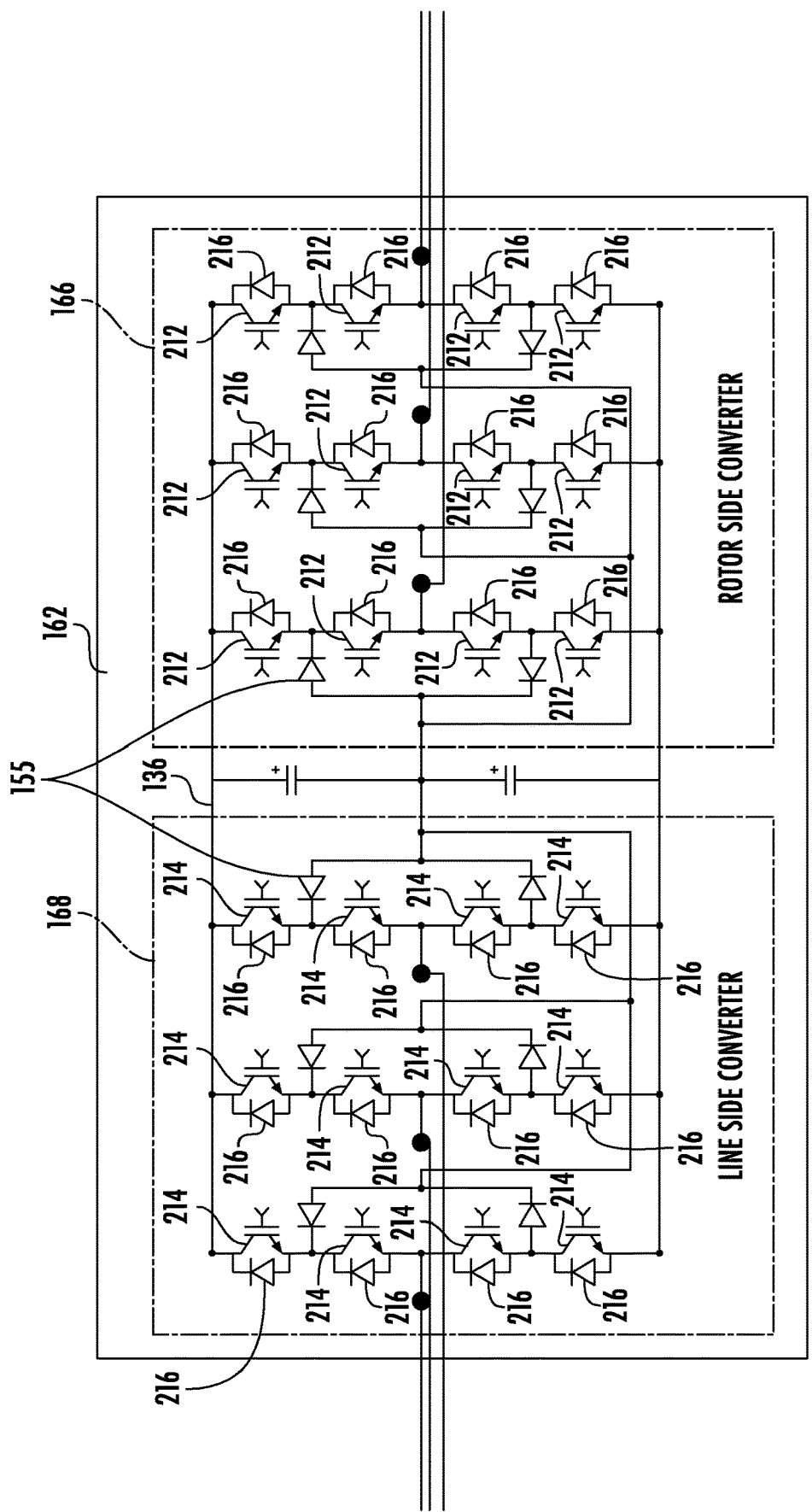
FIG. 3 illustrates a schematic diagram of one embodiment of a three-level voltage-source power converter of a wind turbine according to the present disclosure.

Referring now to FIG. 3, a detailed, schematic diagram of one embodiment of the three-level power converter (i.e. a converter where output voltage has three possible values) shown in FIG. 2 is illustrated in accordance with aspects of the present disclosure. As shown, the RSC 166 includes a plurality of bridge circuits and at least one clamping diode 155 with each phase of the rotor bus 156 input to the rotor side converter 166 being coupled to a single bridge circuit. In addition, the LSC 168 may also include a plurality of bridge circuits and at least one clamping diode 155. Similar to the rotor side converter 166, the line side converter 168 also includes a single bridge circuit for each output phase of the line side converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, the RSC 166 may include a plurality of first IGBTs 212 and the LSC 168 may include a plurality of second IGBTs 214). In addition, as shown, a diode 216 may be coupled in parallel with each of the IGBTs 212, 214. In alternative embodiments, parallel IGBTs and diodes may be used to increase the current rating of the power converter 162. As is generally understood, the LSC 168 and the RSC 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control gate timing commands of the IGBTs to provide a desired output. It should be appreciated by those of ordinary skill in the art that, as an alternative to IGBTs, the power convertor 162 may include any other suitable switching elements.

Figure 4:
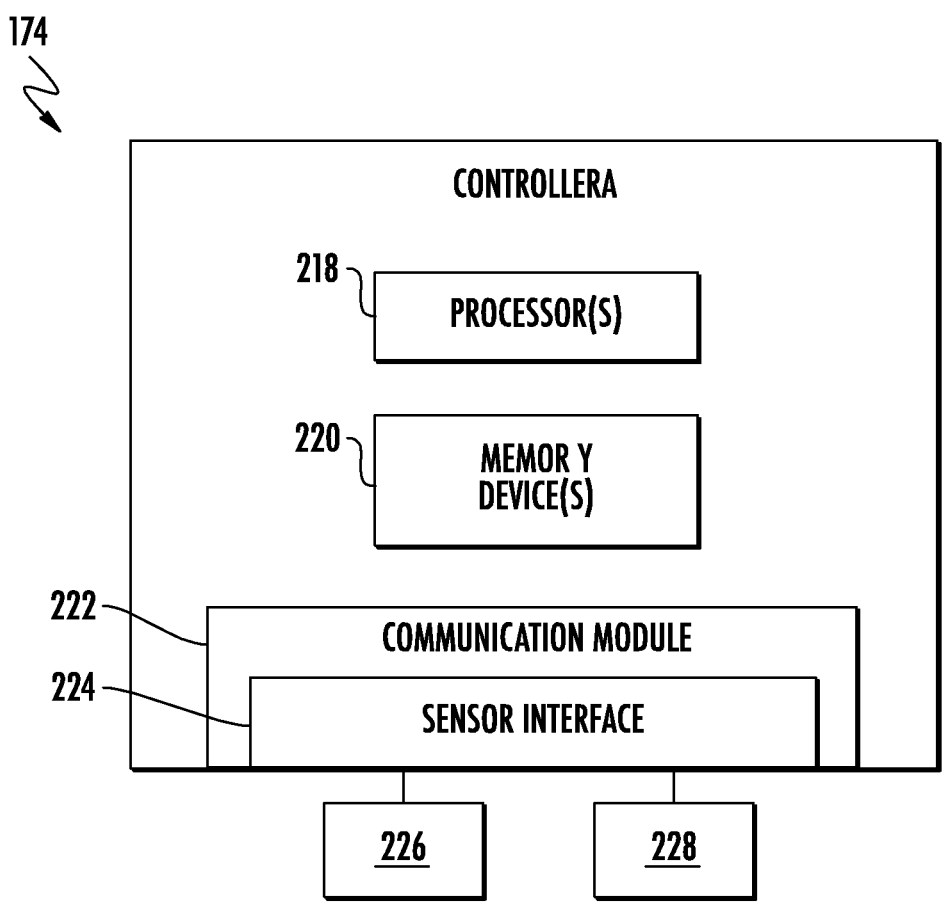
FIG. 4 illustrates a block diagram of one embodiment of a converter controller that can be used to control the voltage source power converter of the wind turbine power system described herein according to the present disclosure.

It should be appreciated that the converter controller 174 may correspond to any suitable computing device and/or any combination of computing devices. For instance, as shown in FIG. 4, the controller 174 may include one or more processor(s) 218 and associated memory device(s) 220 configured to perform a variety of computer-implemented functions (e.g., performing the methods, steps, calculations and the like and storing relevant data as disclosed herein). Additionally, the controller 174 may also include a communications module 222 to facilitate communications between the controller 174 and the various components of the power system 100. Further, the communications module 222 may include a sensor interface 224 (e.g., one or more analog-to-digital converters) to permit signals transmitted from one or more sensors 226, 228 located anywhere through the power system 100 to be converted into signals that can be understood and processed by the processors 218.

It should be appreciated that the sensors 226, 228 may be communicatively coupled to the communications module 222 using any suitable means. For example, as shown in FIG. 4, the sensors 226, 228 may be coupled to the sensor interface 224 via a wired connection. However, in other embodiments, the sensors 226, 228 may be coupled to the sensor interface 224 via a wireless connection, such as by using any suitable wireless communications protocol known in the art. As such, the processor 218 may be configured to receive one or more signals from the sensors 226, 228. Accordingly, such sensors 226, 228 may be located throughout the power system 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 218 is also configured to compute advanced control algorithms and communicate to a variety of Ethernet or serial-based protocols (Modbus, OPC, CAN, etc.). Additionally, the memory device(s) 220 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 220 may generally be configured to store suitable computer-readable instructions that, when implemented by the processor(s) 218, configure the controller 174 to perform the various functions as described herein.

Figure 5:
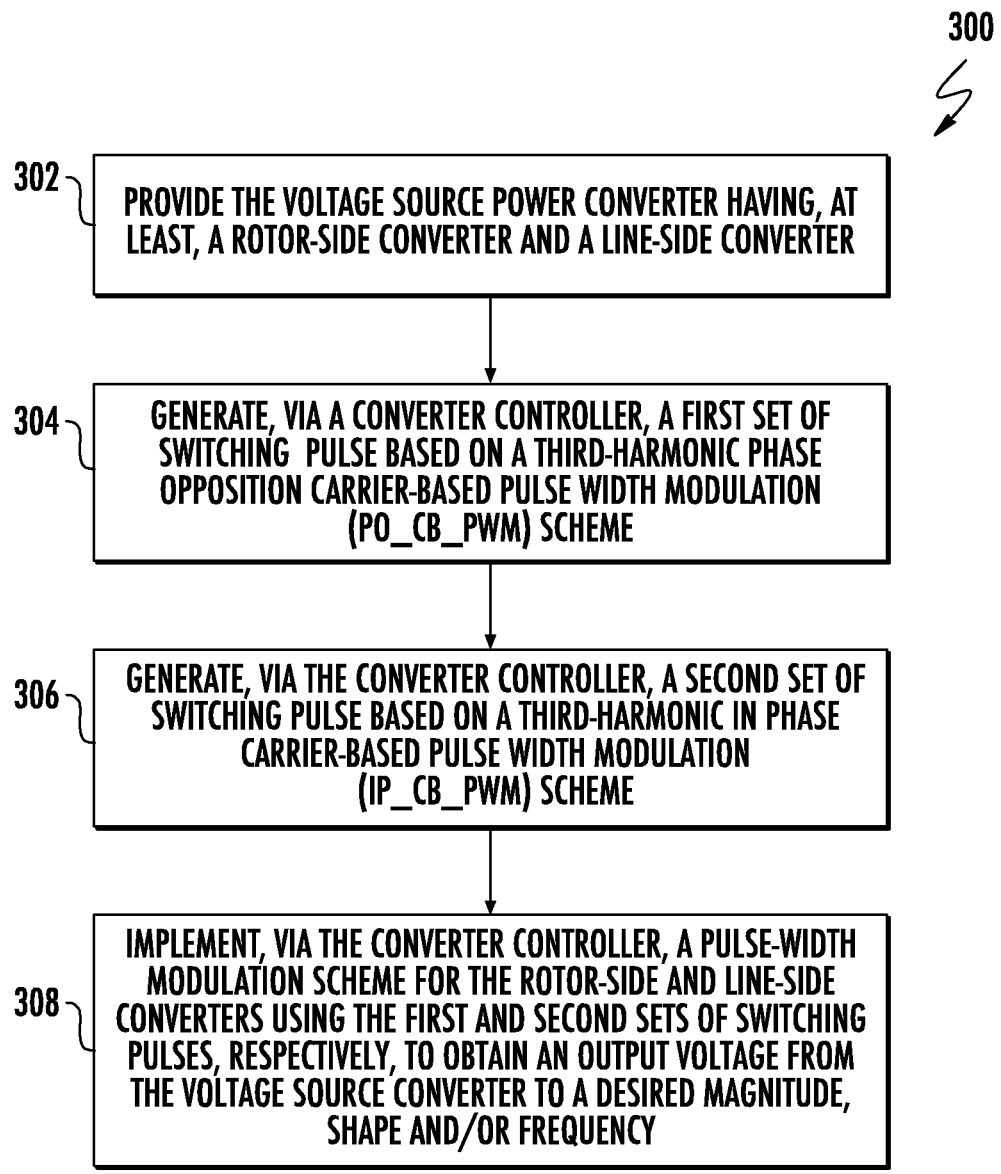
FIG. 5 illustrates a flow diagram of one embodiment of a method for controlling a voltage source power converter of a renewable energy power conversion system according to the present disclosure.

Referring now to FIG. 5, a flow diagram of an embodiment of a method 300 for controlling a voltage source power converter of a renewable energy power conversion system is illustrated in accordance with aspects of the present disclosure. In general, the method 300 is described herein as implemented using, for example, the voltage source power converter 162 of the DFIG wind turbine power system 100 described above. However, it should be appreciated that the disclosed method 300 may be implemented using any other suitable voltage source power converter now known or later developed in the art and is also not limited to wind turbine power systems. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes providing the voltage source power converter 162 having the RSC 166 and the LSC 168. As shown at (304), the method 300 includes generating, via the converter controller 174, a first set of switching pulses based on a third-harmonic phase opposition carrier-based pulse width modulation (PO_CB_PWM) scheme. As shown at (306), the method 300 includes generating, via the converter controller 174, a second set of switching pulses based on a third-harmonic in phase carrier-based pulse width modulation (IP_CB_PWM) scheme.

Figure 6:
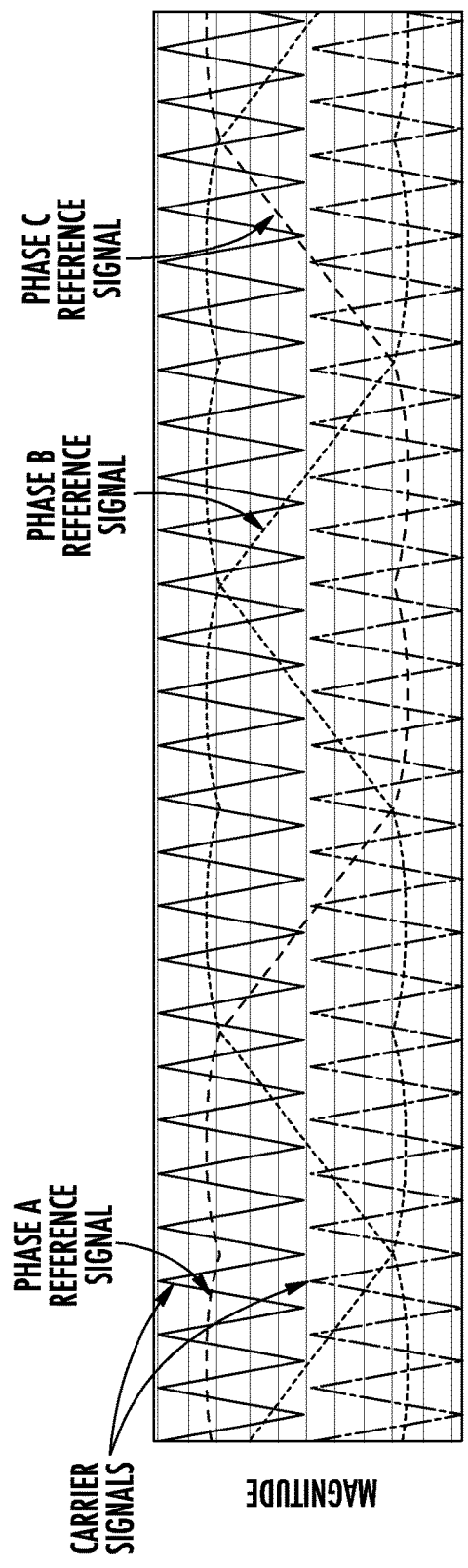
FIG. 6 illustrates a graph of one embodiment of magnitude (y-axis) versus time (x-axis) that illustrates a IP_CB_PWM scheme with respect to IP carrier schemes according to the present disclosure.
Figure 7:
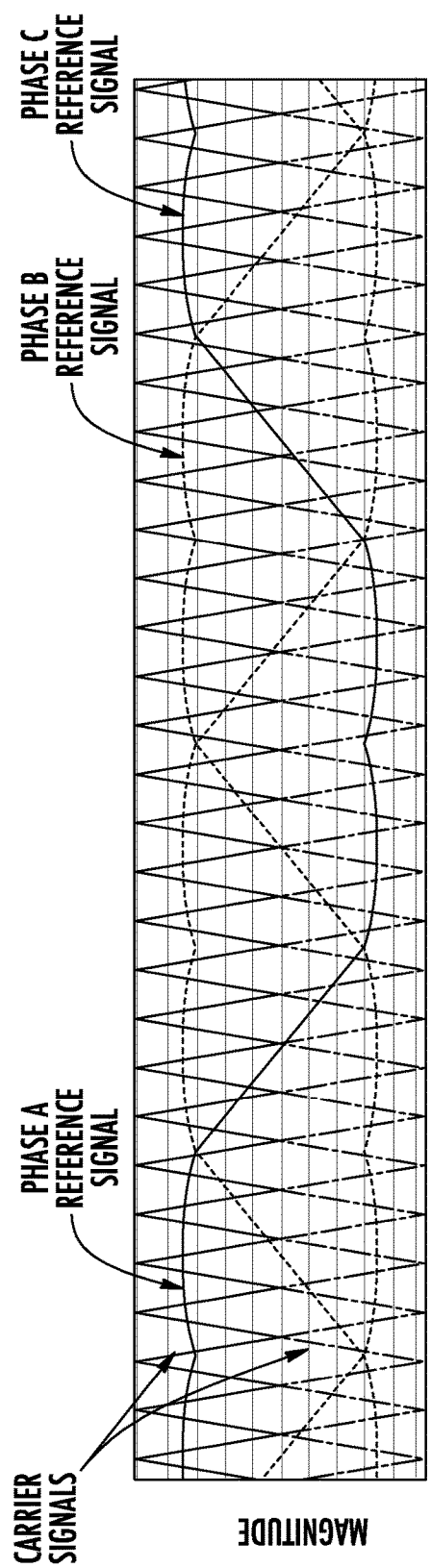
FIG. 7 illustrates a graph of one embodiment of magnitude (y-axis) versus time (x-axis) that illustrates a PO_CB_PWM scheme with respect to PO carrier schemes according to the present disclosure.

For example, to generate a sinusoidal PWM signal, the converter controller 174 provides a sine wave as a reference signal. The frequency of a sine wave is equal to the frequency of the desired output voltage to the modulation of the carrier signal. When the reference signal and the carrier signal are both modulated by the converter controller 174, the result is the signal pulse for the switching devices 212, 214 (e.g. the first and second sets of switching pulses based on the PO_CB_PWM and the IP_CB_PWM schemes, respectively). More specifically, the modulation techniques used herein may include in phase (IP) (FIG. 6) and/or phase opposition (PO) (FIG. 7) modulation techniques. For example, FIG. 6 provides a graph of magnitude (y-axis) versus time (x-axis) that illustrates the IP_CB_PWM scheme generation scheme in which three phase reference signal commands are compared against the carrier signals. As shown, for with respect to the carrier signals. As shown, for PWM signal generation scheme modulation, the carrier signals are in synchronization with each other. Further, FIG. 7 provides a graph of magnitude (y-axis) versus time (x-axis) that illustrates the PO_CB_PWM signal generation scheme in which three phase reference signal commands are compared against the carrier signals. As shown, for phase opposition modulation, the carrier signals 452, 454 are opposite each other.

Referring back to FIG. 5, as shown at (308), the method 300 includes implementing, via the converter controller 174, a pulse-width modulation scheme for the RSC 166 and the LSC 168 using the first and second sets of switching pulses, respectively, to obtain an output voltage from the voltage source converter to a desired magnitude, shape, and/or frequency. For example, in an embodiment, implementing the pulse-width modulation scheme for the rotor-side and line-side converters using the first and second sets of switching pulses, respectively, may include controlling gate timing commands of the first plurality of PWM switching devices 212 of the RSC 166 based on the first set of switching pulses based on the third-harmonic PO_CB_PWM scheme and controlling gate timing commands of the second plurality of PWM switching devices 214 of the LSC 168 based on the second set of switching pulses based on the third-harmonic IP_CB_PWM scheme.

Thus, in such embodiments, the first set of switching pulses based on the third-harmonic PO_CB_PWM scheme is configured to reduce a common mode voltage at the RSC 166 as compared to the second set of switching pulses based on the third-harmonic IP_CB_PWM scheme. The reduced common mode voltages at the RSC 166 further results in reduced common mode current, thereby protecting bearings of the system 100 from premature failures. Moreover, the second set of switching pulses based on the third-harmonic IP_CB_PWM scheme is configured to provide a lower output voltage total harmonic distortion at the LSC 168 as compared to the first set of switching pulses based on the third-harmonic PO_CB_PWM scheme. In addition, the system of the present disclosure does not change the total losses of the switches 212, 214 as compared to conventional systems, which typically use third harmonic injection in phase carrier-based PWM on both the LSC 168 and the RSC 166. Accordingly, the present disclosure provides a PWM technique for the overall three-level IGBT-based back-to-back converter system, which balances better total harmonic distortion the LSC 168 with better reduction in common mode voltage for the RSC 166.

Various aspects and embodiments of the present invention are defined by the following numbered clauses:

Clause 1. A method for controlling a voltage source power converter of a renewable energy power conversion system, the method comprising:
providing the voltage source power converter having, at least, a rotor-side converter and a line-side converter;
generating, via a converter controller, first set of switching pulses based on a third-harmonic phase opposition carrier-based pulse width modulation (PO_CB_PWM) scheme;
generating, via the converter controller, second set of switching pulses based on a third-harmonic in phase carrier-based pulse width modulation (IP_CB_PWM) scheme; and,
implementing, via the converter controller, a pulse-width modulation scheme for the rotor-side and line-side converters using the first and second sets of switching pulses, respectively, to obtain an output voltage from the voltage source converter to a desired magnitude, shape, and/or frequency.

Clause 2. The method of clause 1, wherein the voltage source power converter is a three-level voltage-source power converter.

Clause 3. The method of clauses 1-2, wherein implementing the pulse-width modulation scheme for the rotor-side and line-side converters using the first and second sets of switching pulses, respectively, further comprises:
controlling gate timing commands of a first plurality of pulse-width modulation (PWM) switching devices of the rotor-side converter based on the first set of switching pulses; and,
controlling gate timing commands of a second plurality of PWM switching devices of the line-side converter based on the second set of switching pulses.

Clause 4. The method of any of the preceding clauses, wherein the first and second plurality of PWM switching devices comprise insulated-gate bipolar transistors (IGBTs).

Clause 5. The method of any of the preceding clauses, wherein the first set of switching pulses reduces a common mode voltage at the rotor-side converter as compared to the third-harmonic IP_CB_PWM scheme.

Clause 6. The method of any of the preceding clauses, wherein the second set of switching pulses provides a lower output voltage total harmonic distortion at the line-side converter as compared to the third-harmonic PO_CB_PWM scheme.

Clause 7. The method of any of the preceding clauses, wherein the renewable energy power conversion system further comprises a doubly-fed induction generator coupled to the voltage source power converter.

Clause 8. The method of any of the preceding clauses, wherein the renewable energy power conversion system comprises at least one of a wind turbine power system, a solar power system, or an energy storage system.

Clause 9. A power conversion system for a renewable energy power system, the power conversion system comprising:
a voltage source power converter comprising a rotor-side converter and a line-side converter, the rotor-side converter comprising a first plurality of PWM switching devices and the line-side converter comprising a second plurality of PWM switching devices; and,
a converter controller generating a first set of switching pulses based on a third-harmonic phase opposition carrier-based pulse width modulation (PO_CB_PWM) scheme and a second set of switching pulses based on a third-harmonic in phase carrier-based pulse width modulation (IP_CB_PWM) scheme,
the converter controller controlling a pulse-width modulation scheme for the rotor-side and line-side converters using the first and second sets of switching pulses, respectively, to obtain an output voltage from the voltage source converter to a desired magnitude, shape, and/or frequency.

Clause 10. The power conversion system of clause 9, wherein the voltage source power converter is a three-level voltage-source power converter.

Clause 11. The power conversion system of clauses 9-10, wherein the first and second plurality of PWM switching devices comprise insulated-gate bipolar transistors (IGBTs).

Clause 12. The power conversion system of clauses 9-11, wherein the first set of switching pulses reduces a common mode voltage at the rotor-side converter as compared to the second set of switching pulses.

Clause 13. The power conversion system of clauses 9-12, wherein the second set of switching pulses provides a lower output voltage total harmonic distortion at the line-side converter as compared to the first set of switching pulses.

Clause 14. The power conversion system of clauses 9-13, wherein the renewable energy power conversion system further comprises a doubly-fed induction generator coupled to the voltage source power converter.

Clause 15. The power conversion system of clauses 9-14, wherein the renewable energy power conversion system comprises at least one of a wind turbine power system, a solar power system, or an energy storage system.

Clause 16. A wind turbine power system, comprising:
a generator comprising a rotor and stator;
a power conversion system electrically coupled to the generator, the power conversion system comprising:
a voltage source power converter comprising a rotor-side converter and a line-side converter, the rotor-side converter comprising a first plurality of PWM switching devices and the line-side converter comprising a second plurality of PWM switching devices; and,
a converter controller generating a first set of switching pulses based on a third-harmonic phase opposition carrier-based pulse width modulation (PO_CB_PWM) scheme and a second set of switching pulses based on a third-harmonic in phase carrier-based pulse width modulation (IP_CB_PWM) scheme, the converter controller controlling gate timing commands of the first and second plurality of PWM switching devices of the rotor-side converter and the line-side converter based on the first and second sets of switching pulses, respectively.

Clause 17. The wind turbine power system of clause 16, wherein the voltage source power converter is a three-level voltage-source power converter.

Clause 18. The wind turbine power system of clauses 16-17, wherein the first and second plurality of PWM switching devices comprise insulated-gate bipolar transistors (IGBTs).

Clause 19. The wind turbine power system of clauses 16-18, wherein the generator comprises a doubly-fed induction generator.

Clause 20. The wind turbine power system of clauses 16-19, wherein the first set of switching pulses reduces a common mode voltage at the rotor-side converter as compared to the second set of switching pulses, and wherein the second set of switching pulses provides a lower output voltage total harmonic distortion at the line-side converter as compared to the first set of switching pulses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a voltage source power converter of a renewable energy power conversion system, the method comprising:
    providing the voltage source power converter having, at least, a rotor-side converter and a line-side converter;
    generating, via a converter controller, first set of switching pulses based on a third-harmonic phase opposition carrier-based pulse width modulation (PO_CB_PWM) scheme;
    generating, via the converter controller, second set of switching pulses based on a third-harmonic in phase carrier-based pulse width modulation (IP_CB_PWM) scheme; and,
    implementing, via the converter controller, a pulse-width modulation scheme for the rotor-side and line-side converters using the first and second sets of switching pulses, respectively, to obtain an output voltage from the voltage source converter to a desired magnitude, shape, and/or frequency.

2. The method of claim 1, wherein the voltage source power converter is a three-level voltage-source power converter.

3. The method of claim 1, wherein implementing the pulse-width modulation scheme for the rotor-side and line-side converters using the first and second sets of switching pulses, respectively, further comprises:
    controlling gate timing commands of a first plurality of pulse-width modulation (PWM) switching devices of the rotor-side converter based on the first set of switching pulses; and,
    controlling gate timing commands of a second plurality of PWM switching devices of the line-side converter based on the second set of switching pulses.

4. The method of claim 3, wherein the first and second plurality of PWM switching devices comprise insulated-gate bipolar transistors (IGBTs).

5. The method of claim 1, wherein the first set of switching pulses reduces a common mode voltage at the rotor-side converter as compared to the third-harmonic IP_CB_PWM scheme.

6. The method of claim 1, wherein the second set of switching pulses provides a lower output voltage total harmonic distortion at the line-side converter as compared to the third-harmonic PO_CB_PWM scheme.

7. The method of claim 1, wherein the renewable energy power conversion system further comprises a doubly-fed induction generator coupled to the voltage source power converter.

8. The method of claim 1, wherein the renewable energy power conversion system comprises at least one of a wind turbine power system, a solar power system, or an energy storage system.

9. A power conversion system for a renewable energy power system, the power conversion system comprising:
    a voltage source power converter comprising a rotor-side converter and a line-side converter, the rotor-side converter comprising a first plurality of PWM switching devices and the line-side converter comprising a second plurality of PWM switching devices; and,
    a converter controller generating a first set of switching pulses based on a third-harmonic phase opposition carrier-based pulse width modulation (PO_CB_PWM) scheme and a second set of switching pulses based on a third-harmonic in phase carrier-based pulse width modulation (IP_CB_PWM) scheme,
    the converter controller controlling a pulse-width modulation scheme for the rotor-side and line-side converters using the first and second sets of switching pulses, respectively, to obtain an output voltage from the voltage source converter to a desired magnitude, shape, and/or frequency.

10. The power conversion system of claim 9, wherein the voltage source power converter is a three-level voltage-source power converter.

11. The power conversion system of claim 9, wherein the first and second plurality of PWM switching devices comprise insulated-gate bipolar transistors (IGBTs).

12. The power conversion system of claim 9, wherein the first set of switching pulses reduces a common mode voltage at the rotor-side converter as compared to the second set of switching pulses.

13. The power conversion system of claim 9, wherein the second set of switching pulses provides a lower output voltage total harmonic distortion at the line-side converter as compared to the first set of switching pulses.

14. The power conversion system of claim 9, wherein the renewable energy power conversion system further comprises a doubly-fed induction generator coupled to the voltage source power converter.

15. The power conversion system of claim 9, wherein the renewable energy power conversion system comprises at least one of a wind turbine power system, a solar power system, or an energy storage system.

16. A wind turbine power system, comprising:
    a generator comprising a rotor and stator;
    a power conversion system electrically coupled to the generator, the power conversion system comprising:

a voltage source power converter comprising a rotor-side converter and a line-side converter, the rotor-side converter comprising a first plurality of PWM switching devices and the line-side converter comprising a second plurality of PWM switching devices; and, a converter controller generating a first set of switching pulses based on a third-harmonic phase opposition carrier-based pulse width modulation (PO_CB_PWM) scheme and a second set of switching pulses based on a third-harmonic in phase carrier-based pulse width modulation (IP_CB_PWM) scheme, the converter controller controlling gate timing commands of the first and second plurality of PWM switching devices of the rotor-side converter and the line-side converter based on the first and second sets of switching pulses, respectively.

17. The wind turbine power system of claim 16, wherein the voltage source power converter is a three-level voltage-source power converter.

18. The wind turbine power system of claim 16, wherein the first and second plurality of PWM switching devices comprise insulated-gate bipolar transistors (IGBTs).

19. The wind turbine power system of claim 16, wherein the generator comprises a doubly-fed induction generator.

20. The wind turbine power system of claim 16, wherein the first set of switching pulses reduces a common mode voltage at the rotor-side converter as compared to the second set of switching pulses, and wherein the second set of switching pulses provides a lower output voltage total harmonic distortion at the line-side converter as compared to the first set of switching pulses.

* * * * *